Jan. 2, 1962 R. W. DOWLING ETAL 3,015,252
BINOCULAR TELESCOPE FOCUSING MEANS
Filed Jan. 28, 1960

INVENTORS
ROBERT WHITTLE DOWLING
LORENZO del RICCIO
BY
Pennie, Edmonds, Morton, Barrows & Taylor
ATTORNEYS

United States Patent Office 3,015,252
Patented Jan. 2, 1962

3,015,252
BINOCULAR TELESCOPE FOCUSING MEANS
Robert W. Dowling, New York, N.Y., and Lorenzo del Riccio, Los Angeles, Calif., assignors to D & D Company, Inc., New York, N.Y., a corporation of Delaware
Filed Jan. 28, 1960, Ser. No. 5,175
6 Claims. (Cl. 88—34)

This invention relates to focusing means for a binocular telescope and specifically to means for separate focusing of each lens system in a theater and sporting event type binocular telescope.

The focusing means of this invention is particularly adapted for use in a compact, generally rectangular binocular telescope employing a pair of ocular-objective lens systems respectively mounted in two box-like lens casings slidably arranged on a connecting bridge, such as described in copending application "Binocular Telescope" Serial No. 783,977 filed December 30, 1958, of Robert Whittle Dowling, and Lorenzo del Riccio, of which this application is a continuation-in-part.

It is the purpose of this invention to enable persons whose vision is not the same for both eyes to use these binoculars. To permit such use, this invention provides improved means whereby each of the two lens systems may be focused separately to provide sharp and distinct magnified viewing of stage or sporting events thereby increasing the utility of the instrument without sacrificing any of the advantageous features of compactness and rectangular, generally pleasing appearance of this binocular telescope.

A further purpose of this invention is to provide for easy and rapid adjustment in the individual focusing means whereby the viewer may with greatly improved facility adjust each lens to accommodate his vision in a darkened theater or auditorium or in a large sporting arena where events are occuring in rapid succession perhaps at widely varying distances from the viewer's location, or perhaps where a binocular telescope is used in a theater party by several viewers whose vision may vary, requiring separate focusing by each user. This invention permits of more prompt focusing under these conditions than has been obtainable heretofore with individual lens focusing methods provided in such a binocular telescope, and as mentioned, does so without sacrifice in any way of the advantageous physical characteristics of the entire instrument.

In a particular embodiment of this invention, a mounting sleeve carrying an ocular lens is arranged in each lens case in such a way that each ocular can be moved independently of the other in the direction of its respective optical axis. It is also possible in this invention to provide for movable objective lenses, such that lens system focusing is achieved by moving either the ocular or the objective or both.

However, in the embodiment mentioned, the ocular lens and lens mounting sleeve are moved as a unit for focusing. Each sleeve is attached at its inner end to a fork-shaped transmission yoke which also moves in the optical axis directions. Such movement is achieved by cooperation of rotatable actuating bolts which through eccentrics, also engage the transmission yokes. The rotating bolts are mounted transversely, internal of the central bridge of the binocular telescope such that they may move only in rotatory fashion about their own longitudinal axis. When rotated, the eccentrics produce axial movement in the movable transmission yokes and ocular lens units.

Each actuating bolt is provided with a small lever arm attached to its inner end in the generally central portion of the connecting bridge. Each lever arm projects through a slot in the field side of the connecting bridge and is of adequate length and shape to be easily accessible to the viewer's finger or thumb when the cases are in the extended position for viewing. Small pressure applied to either of the said lever arms will produce rotation of the described bolt mechanism which cooperates as described to produce axial movement of the ocular to achieve proper focus for the eye of the viewer.

For a better understanding of the invention reference should be made to the following detailed description and to the accompanying drawings in which.

Figure 1:
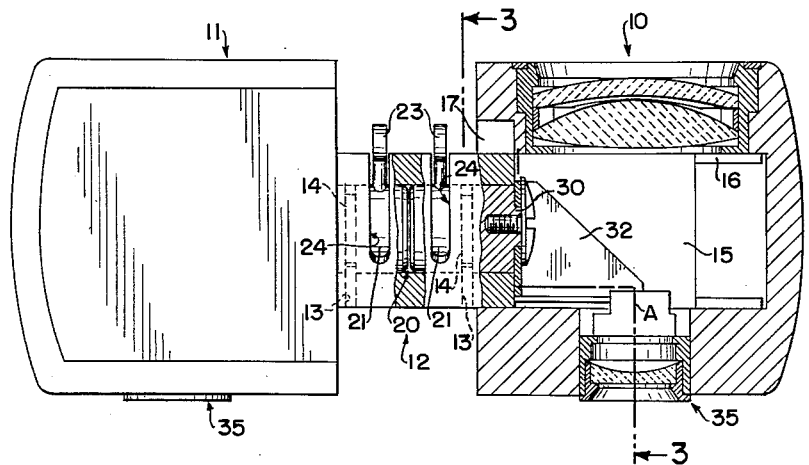
FIGURE 1 is a plan view of the binocular telescope in the extended or viewing position, with a lens case cut away and the connecting bridge partially cut away.
Figure 2:
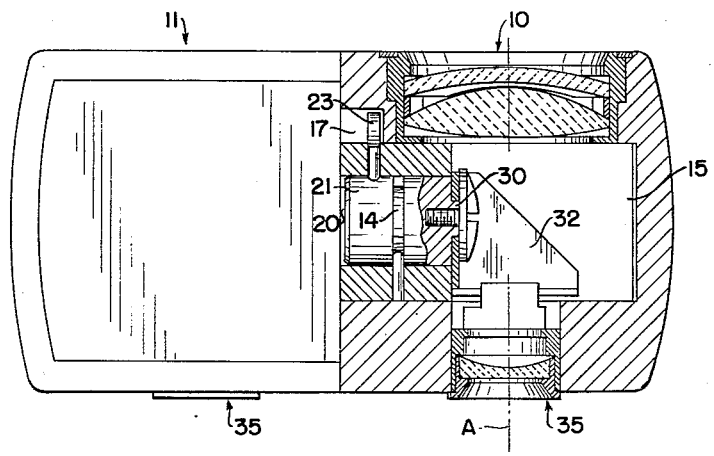
FIGURE 2 shows the binocular telescope of FIGURE 1 in the closed or carrying position with a lens case and part of the connecting bridge cut away; and, FIGURE 3 is a sectional view taken along line 3—3 of FIGURE 1.
Figure 3:
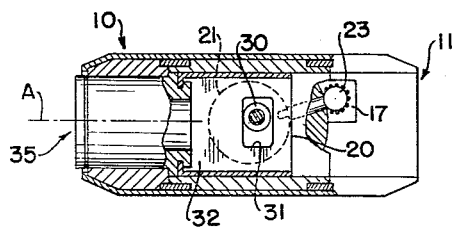

Referring to the drawings and particularly to FIGURES 1 and 2, two rectangular box-like lens cases 10 and 11 are slidably mounted on a connecting bridge member 12. In FIGURE 1 the cases 10 and 11 are shown in the extended or viewing position. The cases are in the closed or carrying position in the view of FIGURE 2.

The connecting bridge member 12 comprises at its end guide members 15 that are shaped to be accommodated and be carried in guide rails 16 of the cases. Connecting bridge 12 also comprises a drilled bolt hole 20 into which two pin-type bolts 21 are journaled and aligned in such a way that their inner end faces are not in contact with each other. Said bolts have slot type key-ways 14 cut into a portion of their outer periphery such that when in place pin type keys 13 which are placed in the connecting bridge 12 project therein to prohibit axial motion of the bolts and to limit the arc through which said bolts may be rotated.

Each of the outer bolt ends projects into the cases 10 and 11 and comprises an eccentric 30 which mates with a slot 31 on the inner side of a fork shaped transmission yoke 32, said forked yokes also being attached above and below the field of sight to the outer member or sleeve of the ocular-eyepieces which as a unit are designated 35.

Ocular lens units 35 each comprise an ocular lens mounted in the above mentioned movable sleeve. The sleeve of said eyepiece units engages the upper side of fork-shaped transmission yoke 32 which cooperates on its inner side with said eccentric 30 in producing motion of the eyepiece units 35 in the direction of their respective optical axis A indicated by a dashed line.

Actuation of lever 23 causes the respective bolt 21 to rotate in place thereby changing the radial position of eccentric 30. Such action of eccentric 30 which meshes at all times with slot 31 imparts a force component in the direction of the optical axis A to the forked yoke 32, said component causing forked member 32 and the attached movable eyepiece units 35 to move in their respective optical axis directions, thereby achieving a suitable setting or focus to accommodate the vision of the eye of the viewer.

The slidable cases 10 and 11 present recesses 17 machined therein to accommodate the outer ends of lever arms 23 when said cases are closed for carrying. When the binocular telescope is extended for viewing the lever arms 23 project sufficiently outward of connecting bridge 12 at the substantially central and open portions thereof to be easily and readily locatable by touch or feel during use in darkened theaters or in sporting arenas, thereby providing a rapid means for individual focusing to accommodate each eye of the viewer.

The embodiment described is particularly advantageous in that it is positive and fast acting, which increases the utility of the binocular telescope and at the same time advantageously permits the viewer to devote maximum time and attention to the events being observed.

The invention has been set forth and described in detail so that it may be thoroughly understood by those skilled in the art. However, it should be understood that changes from the particular embodiments described may be made without departing from the clear teachings of the invention. Accordingly, reference should be had to the following appended claims to determine the scope of the invention.

We claim:

1. A binocular telescope comprising a pair of ocular-objective lens combinations, a casing for each of said lens combinations mounting the lenses of a combination in spaced relation, one of the lenses in each combination being adjustable along its optical axis, a unitary support member disposed transversely of the optical axes and engaging said casings, at least one of said casings being slidable on said support member to provide interpupillary distance accommodation when said casings are mutually separated for use and to provide for mutual movement of said casings to closed positions, individual lens system focusing means carried by said support member and extending into the casings, said focusing means comprising separately rotatable shaft means journalled by the support, means for rotating said shaft means, said shaft means having eccentric portions exposed in said casings, and connector elements carried by said support and transversely slidably engaging portions of said movable lenses of the combination in all positions of said casings, said connector elements also engaging said eccentric portions of said shafts, said shafts having rotative freedom relative to said elements to cause translation of said elements and movable lenses along said optical axes when said shaft means is rotated.

2. A binocular telescope comprising a pair of ocular-objective lens combinations, a casing for each of said lens combinations mounting the lenses of a combination in spaced relation, one of the lenses in each combination being mounted in a sleeve adjustable along an optical axis, a unitary support member disposed transversely of the optical axes and engaging said casings, at least one of said casings being slidable on said support member to provide interpupillary distance accommodation when said casings are mutually separated for use and to provide for mutual movement of said casings to closed positions, focusing means comprising two separately rotatable aligned shafts journalled by said support, means for rotating said shafts and means restraining axial movement of said shaft, said shafts having eccentric portions exposed in said casings, and connector elements carried by said support and transversely slidably engaging said movable lens sleeves in all positions of said casings, said connector elements also engaging said eccentric portions of said shafts and slidably engaging upper and lower portions of said casings, said shafts having rotative freedom relative to said elements to cause said elements and movable lens sleeves to be translated in a direction along one of said optical axes when said shafts are rotated.

3. The binocular telescope of claim 2, in which each of said rotatable shafts includes a slot-type keyway circumferencially disposed over a portion of the periphery thereof internally of said support member, each of said keyways being engaged by a mating pin-type key, said keys being rigidly affixed to said support member and extending into said keyways whereby rotary and axial motion of said shafts is limited.

4. A binocular telescope comprising a pair of ocular-objective lens combinations, a box-like casing for each of said lens combinations mounting the lenses of a combination in spaced relation, one of the lenses in each combination being mounted in a sleeve adjustable along one of the optical axes, a unitary support member disposed transversely of the optical axes and engaging said casings, each of said casings being slidable on said support member to provide interpupillary distance accommodation when said casings are mutually separated for use and to provide for mutual movement of said casings to closed positions, said casings in closed positions completely enveloping said support member, and individual focusing means comprising separate rotatable shaft means journalled by the support, means for rotating said shaft means, said shaft means having eccentric portions exposed in said casings, fork-shaped connector elements carried by said support member and positioned in each casing, said connector elements having upper and lower arms outside of the field of sight slidably engaging upper and lower portions of said casings, said arms having flanged means fitted into receiving grooves defined by said movable lens sleeves to accommodate transverse slidable movement of said connector elements relative to said sleeves in all positions of said casings, said connector elements also having an intermediate web joining said upper and lower arms and defining a slot receiving said eccentric portions of said shafts, said shafts having rotative freedom relative to said slots to move said elements and movable lens sleeves in a direction along one of said optical axes when said shafts are rotated.

5. A binocular telescope comprising a pair of ocular-objective lens combinations, a casing for each of said lens combinations mounting the lenses of a combination in spaced relation, one of the lenses in each combination being mounted in a sleeve adjustable along an optical axis, a unitary support member disposed transversely of the optical axes and engaging said casings, at least one of said casings being slidable on said support member to provide interpupillary distance accommodation when said casings are mutually separated for use and to provide for mutual movement of said casings to closed positions, and focusing means comprising two separately rotatable aligned shafts journalled by said support, a manually manipultatable lever arm attached to each shaft and having handle portions thereof exposed externally of said support member, said support member being constructed to provide limited swinging movement of each of said levers to rotate each of said shafts, said casings defining recess means to envelope said handle portions when said casings are in closed positions, said shafts having eccentric portions exposed in said casings, connector elements carried by said support and transversely slidably engaging said movable lens sleeves in all positions of said casings, said connector elements also engaging said eccentric portions of said shafts and slidably engaging upper and lower portions of said casings, said shafts having rotative freedom relative to said elements to cause said elements and movable lens sleeves to be translated in a direction along one of said optical axes when said shafts are rotated.

6. The binocular telescope of claim 5 in which said handle portions comprise flat-circular knobs, the planes thereof extending generally perpendicular to said support member.

References Cited in the file of this patent

UNITED STATES PATENTS

| 2,105,348 | Chesnut | Jan. 11, 1938 |

FOREIGN PATENTS

| 256 | Great Britain | of 1900 |
| 28,027 | Great Britain | of 1903 |
| 4,701 | Great Britain | of 1904 |
| 135,752 | Great Britain | Dec. 4, 1919 |
| 364,747 | Germany | Dec. 1, 1922 |